United States Patent
He et al.

(10) Patent No.: US 9,544,823 B2
(45) Date of Patent: Jan. 10, 2017

(54) DYNAMIC UPLINK AND DOWNLINK CONFIGURATION USING FLEXIBLE SUBFRAMES

(75) Inventors: Hong He, Beijing (CN); Jong-Kae Fwu, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 806 days.

(21) Appl. No.: 13/608,369

(22) Filed: Sep. 10, 2012

(65) Prior Publication Data

US 2013/0188516 A1   Jul. 25, 2013

Related U.S. Application Data

(60) Provisional application No. 61/589,774, filed on Jan. 23, 2012.

(51) Int. Cl.
*H04W 72/00* (2009.01)
*H04W 36/00* (2009.01)
(Continued)

(52) U.S. Cl.
CPC ....... *H04W 36/0066* (2013.01); *H04B 17/318* (2015.01); *H04L 5/0096* (2013.01);
(Continued)

(58) Field of Classification Search
CPC .. H04W 36/0066; H04W 28/16; H04W 72/08; H04W 48/16; H04W 36/0061; H04W 88/06; H04W 88/10; H04L 5/0096
See application file for complete search history.

(56) References Cited

U.S. PATENT DOCUMENTS

| 8,209,576 B2 | 6/2012 | Zhang |
| 8,705,461 B2 | 4/2014 | Bala et al. |

(Continued)

FOREIGN PATENT DOCUMENTS

| JP | 2011243353 A | 12/2011 |
| JP | 5882503 B2 | 3/2016 |

(Continued)

OTHER PUBLICATIONS

"Evolved Universal Terrestrial Radio Access (E-UTRA); Multiplexing and channel coding", ETSI TS 136 212 V10.6.0. 3GPP TS 36.212 version 10.6.0. Release 10. LTE., (Jul. 2012), 81 pgs.

(Continued)

*Primary Examiner* — Gbemileke Onamuti
(74) *Attorney, Agent, or Firm* — Schwegman Lundberg & Woessner, P.A.

(57) ABSTRACT

An apparatus and method for dynamically changing an uplink and downlink ratio configuration is disclosed herein. An evolved Node B (eNodeB) operating in a wireless communications network transmits a System Information Block Type 1 (SIB1) including first uplink and downlink ratio configuration information. The eNodeB also transmits in at least one downlink sub frame of a radio frame configured in the first uplink and downlink ratio configuration second uplink and downlink ratio configuration information. The second uplink and downlink ratio configuration information is included in a downlink control information (DCI) message. The DCI message is included in the at least one downlink subframe of the radio frame.

25 Claims, 10 Drawing Sheets

(51) Int. Cl.

| | | |
|---|---|---|
| *H04W 28/16* | (2009.01) | |
| *H04W 88/10* | (2009.01) | |
| *H04B 17/318* | (2015.01) | |
| *H04L 5/00* | (2006.01) | |
| *H04W 72/08* | (2009.01) | |
| *H04W 88/06* | (2009.01) | |
| *H04W 48/16* | (2009.01) | |
| *H04B 17/382* | (2015.01) | |

(52) U.S. Cl.
CPC ....... *H04W 28/16* (2013.01); *H04W 36/0061* (2013.01); *H04W 72/08* (2013.01); *H04W 88/06* (2013.01); *H04W 88/10* (2013.01); *H04B 17/382* (2015.01); *H04W 48/16* (2013.01)

(56) References Cited

U.S. PATENT DOCUMENTS

| | | | |
|---|---|---|---|
| 8,891,402 B2* | 11/2014 | Yin et al. ................ | 370/254 |
| 8,934,350 B2* | 1/2015 | Chen et al. ............... | 370/241 |
| 2005/0259629 A1 | 11/2005 | Oliver et al. | |
| 2008/0285513 A1 | 11/2008 | Jung et al. | |
| 2009/0249153 A1 | 10/2009 | Zhang | |
| 2011/0002320 A1 | 1/2011 | Yuk et al. | |
| 2011/0141985 A1 | 6/2011 | Larsson et al. | |
| 2011/0310856 A1 | 12/2011 | Hariharan et al. | |
| 2012/0113831 A1* | 5/2012 | Pelletier et al. ............. | 370/252 |
| 2012/0300714 A1* | 11/2012 | Ng ................... | H04W 56/0045 370/329 |
| 2013/0003664 A1* | 1/2013 | Frenne ............. | H04W 72/1289 370/329 |
| 2013/0155969 A1 | 6/2013 | Moon et al. | |
| 2013/0163543 A1* | 6/2013 | Freda et al. ................ | 370/329 |
| 2014/0161002 A1* | 6/2014 | Gauvreau et al. ........... | 370/280 |

FOREIGN PATENT DOCUMENTS

| | | |
|---|---|---|
| KR | 20100139062 A | 12/2010 |
| KR | 20110084965 A | 7/2011 |
| KR | 20110102145 A | 9/2011 |
| KR | 101591494 B1 | 2/2016 |
| WO | WO-2011077288 A2 | 6/2011 |
| WO | WO-2013069218 A1 | 5/2013 |
| WO | WO-2013112372 A1 | 8/2013 |

OTHER PUBLICATIONS

"Evolved Universal Terrestrial Radio Access (E-UTRA); Physical channels and modulation", ETSI TS 136 211 V10.5.0. 3GPP TS 36.211 version 10.5.0 Release 10. LTE., (Jul. 2012), 103 pgs.

"Evolved Universal Terrestrial Radio Access (E-UTRA); Physical channels and modulation", ETSI TS 136 211 V9.1.0. 3GPP TS 36.211 version 9.1.0 Release 9. LTE., (Apr. 2010), 87 pgs.

"Evolved Universal Terrestrial Radio Access (E-UTRA); User Equipment (UE) radio transmission and reception", ETSI TS 136 101 V10.4.0. 3GPP TS 36.101 version 10.4.0 Release 10. LTE., (Nov. 2011), 244 pgs.

"International Application Serial No. PCT/US2013/022165, International Search Report mailed May 9, 2013", 3 pgs.

"International Application Serial No. PCT/US2013/022165, Written Opinion mailed May 9, 2013", 4 pgs.

"Chinese Application Serial No. 201380011012.8, Amendment filed Aug. 26, 2014", W/ English Translation, 49 pgs.

"Discussion on remaining issues for CIF in LTE-A", 3GPP Draft; 3rd Generation Partnership Project (3GPP), Mobile Competence Centre ; 650, Route Des Lucioles ; F-06921 Sophia-Antipolis Cedex, (Jun. 22, 2010), 1-4.

"European Application Serial No. 13741219.3, Extended European Search Report mailed Sep. 9, 2015", 6 pgs.

"International Application Serial No. PCT/US2013/022165, International Preliminary Report on Patentability mailed Aug. 7, 2014", 6 pgs.

"Japanese Application Serial No. 2014-553456, Office Action mailed Jun. 2, 2015", W/ English Translation, 7 pgs.

"Japanese Application Serial No. 2014-553456, Response filed Aug. 31, 2015 to Office Action mailed Jun. 2, 2015", W/ English Claims, 15 pgs.

"Korean Application Serial No. 2014-7023597, Office Action mailed Apr. 29, 2015", W/ English Translation, 11 pgs.

"Korean Application Serial No, 2014-7023597, Response filed Jul. 29, 2015 to Office Action mailed Apr. 29, 2015", W/ English Claims, 13 pgs.

* cited by examiner

DYNAMIC UPLINK AND DOWNLINK CONFIGURATION USING FLEXIBLE SUBFRAMES

CROSS-REFERENCE TO RELATED APPLICATIONS

This application claims priority to U.S. Provisional Patent Application No. 61/589,774 entitled "Advanced Wireless Communication Systems and Techniques" filed on Jan. 23, 2012, the content of which is incorporated herein by reference in its entirety.

TECHNICAL FIELD

The present disclosure relates generally to wireless communications. More particularly, the present disclosure relates to changing uplink and downlink ratio configurations within wireless communication systems.

BACKGROUND

In the current 3rd Generation Partnership Project (3GPP) long term evolution (LTE) time division duplex (TDD)-Advanced systems, the same frequency bands are used for the uplink and downlink transmissions between evolved-universal terrestrial radio access network (E-UTRAN) node Bs (eNodeBs) and user equipment (UE). Uplink and downlink transmissions are separated by transmitting either uplink data or downlink data at each pre-determined block of time, known as subframes, on the same frequency bands. In TDD deployment, the uplink and downlink transmissions are structured into radio frames, each 10 ms in time length. Each radio frame may comprise a single frame or two half-frames of each 5 ms in time length. Each half-frame, in turn, may comprise five subframes of 1 ms time length each. Particular designations of subframes within a radio frame for uplink or downlink transmission—referred to as uplink and downlink configurations—can be defined. The seven supported uplink and downlink configurations (also referred to UL/DL configurations, uplink-downlink configurations, or uplink-downlink ratio configurations) are shown in a table 100 of FIG. 1, in which "D" denotes a sub frame reserved for downlink transmission, "U" denotes a subframe reserved for uplink transmission, and "S" denotes a special sub frame which includes the downlink pilot time slot (DwPTS), guard period (GP) and uplink pilot time slot (UpPTS) fields. (See 3GPP TS 36.211 Version 10.5.0, E-UTRA Physical Channels and Modulation (Release 10), June 2012.) In the currently supported uplink-downlink configurations, between 40 to 90% of the subframes within a given radio frame are downlink subframes.

The EUTRAN decides which one of the supported uplink-downlink configurations applies for a given eNodeB. Once the uplink-downlink configuration has been allocated, this configuration is typically not changed during normal operation of the cell or cells served by the eNodeB. This is the case even when uplink or downlink transmission loads are mismatched to the current uplink-downlink configuration. Even if the uplink-downlink configuration for a given eNodeB is desirous of being changed, there is a minimum latency of 640 ms under the current standard to effect modification of the System Information Block Type 1 (SIB1) information—the mechanism by which the uplink-downlink configuration is allocated and re-allocated. Current 3GPP LTE-Advanced systems do not support dynamic adjustment of the uplink and downlink ratio configurations.

DETAILED DESCRIPTION

The following description is presented to enable any person skilled in the art to create and use a computer system configuration and related method and article of manufacture to dynamically adjust the uplink-downlink configuration by any eNodeB within a wireless communications network using an indication mechanism that does not involve modification of the System Information Block Type 1 (SIB1). A new radio frame structure is defined that includes one or more flexible subframes. One or more of such flexible subframes is dynamically switched from being an uplink subframe to a downlink subframe, or vice versa, within a radio frame time period. The new uplink-downlink configuration defined by the dynamically switched flexible subframe(s) is identified using a configuration indication field (CIF) value. A new downlink control information (DCI) format is defined to include the CIF value indicative of the new uplink-downlink configuration. The DCI message including the CIF value is transmitted in the physical downlink control channel (PDCCH) region within the control region of the downlink subframe(s). The CIF indication scheme is recognizable by Release 11 or later user equipment (UEs) associated with the given eNodeB, while the legacy UEs (e.g., Release 8/9/10 UEs) associated with the given eNodeB continue to operate according to the uplink-downlink configuration allocated using SIB1.

Various modifications to the embodiments will be readily apparent to those skilled in the art, and the generic principles defined herein may be applied to other embodiments and applications without departing from the scope of the invention. Moreover, in the following description, numerous details are set forth for the purpose of explanation. However, one of ordinary skill in the art will realize that embodiments of the invention may be practiced without the use of these specific details. In other instances, well-known structures and processes are not shown in block diagram form in order not to obscure the description of the embodiments of the invention with unnecessary detail. Thus, the present disclosure is not intended to be limited to the embodiments shown, but is to be accorded the widest scope consistent with the principles and features disclosed herein.

Figures 1, 2:
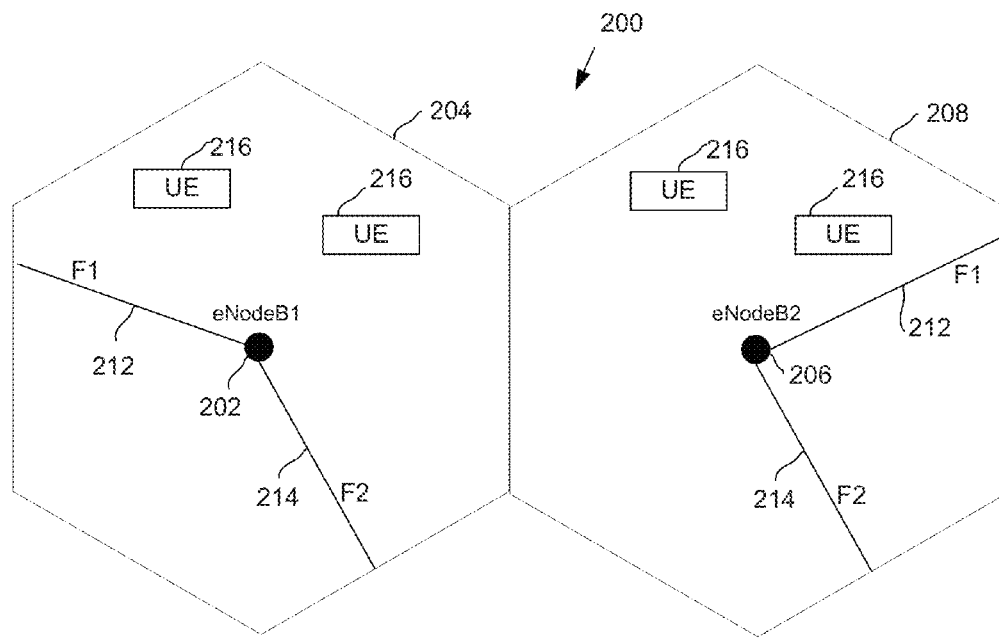
FIG. 1 illustrates supported uplink-downlink ratio configurations under the current 3GPP LIE TDD-Advanced standard.
FIG. 2 illustrates an example (portion) of a wireless communications network shown in a homogenous network deployment according to some embodiments.

The dynamic uplink-downlink (UL/DL) re-configuration mechanism described herein is applicable in homogeneous and/or heterogeneous network deployments. Example homogenous and heterogeneous network deployments are illustrated respectively in FIGS. 2 and 4. FIG. 2 illustrates an example (portion) of a wireless communications network 200 shown in a homogenous network deployment according to some embodiments. In one embodiment, the wireless communications network 200 comprises an evolved universal terrestrial radio access network (EUTRAN) using the 3rd Generation Partnership Project (3GPP) long term evolution (LTE) standard and operating in time division duplexing (TDD) mode. The wireless communications network 200 includes a first EUTRAN or evolved Node B (eNodeB or eNB) 202, a second eNodeB 206, and a plurality of user equipments (UEs) 216.

The first eNodeB 202 (also referred to as eNodeB1 or a first base station) serves a certain geographic area, denoted as a first cell 204. The UEs 216 located within the first cell 204 are served by the first eNodeB 202. The first eNodeB 202 communicates with the UEs 216 on a first carrier frequency 212 (F1) and optionally, one or more secondary carrier frequencies, such as a second carrier frequency 214 (F2).

The second eNodeB 206 is similar to the first eNodeB 202 except it serves a different cell from that of the first eNodeB 202. The second eNodeB 206 (also referred to as eNodeB2 or a second base station) serves another certain geographic area, denoted as a second cell 208. The UEs 216 located within the second cell 208 are served by the second eNodeB 206. The second eNodeB 206 communicates with the UEs 216 on the first carrier frequency 212 (F1) and optionally, one or more secondary carrier frequencies, such as the second carrier frequency 214 (F2).

The first and second cells 204, 208 may or may not be immediately co-located next to each other. However, the first and second cells 204, 208 are situated close enough to be considered neighboring cells, such that the user traffic pattern of one of the first or second eNodeB 202, 206 is relevant to the other eNodeB. For example, one of the UE 216 served by the first eNodeB 202 may move from the first cell 204 to the second cell 208, in which case a hand-off takes places from the first eNodeB 202 to the second eNodeB 206 with respect to the particular UE 316.

The UEs 216 may comprise a variety of devices that communicate within the wireless communications network 200 including, but not limited to, cellular telephones, smart phones, tablets, laptops, desktops, personal computers, servers, personal digital assistants (PDAs), web appliances, set-top box (STB), a network router, switch or bridge, and the like. The UEs 216 can comprise Release 8, 9, 10, 11, and/or later UEs.

It is understood that the wireless communications network 200 includes more than two eNodeBs. It is also understood that each of the first and second eNodeBs 202, 206 can have more than one neighboring eNodeB. As an example, the first eNodeB 202 may have six or more neighboring eNodeBs.

In one embodiment, the UEs 216 located in respective first or second cells 204, 208 transmits data to its respective first or second eNodeB 202, 206 (uplink transmission) and receives data from its respective first or second eNodeB 202, 206 (downlink transmission) using radio frames comprising Orthogonal Frequency-Division Multiple Access (OFDMA) frames configured for time division duplexing (TDD) operations. Each of the radio frames comprises a plurality of uplink and downlink subframes, the uplink and downlink subframes configured in accordance with the uplink-downlink ratio configuration selected from among the supported uplink-downlink ratio configurations shown in FIG. 1. (See 3GPP TS 36.211 Version 9.1.0, E-UTRA Physical Channels and Modulation (Release 9), March 2010.)

Figure 3:
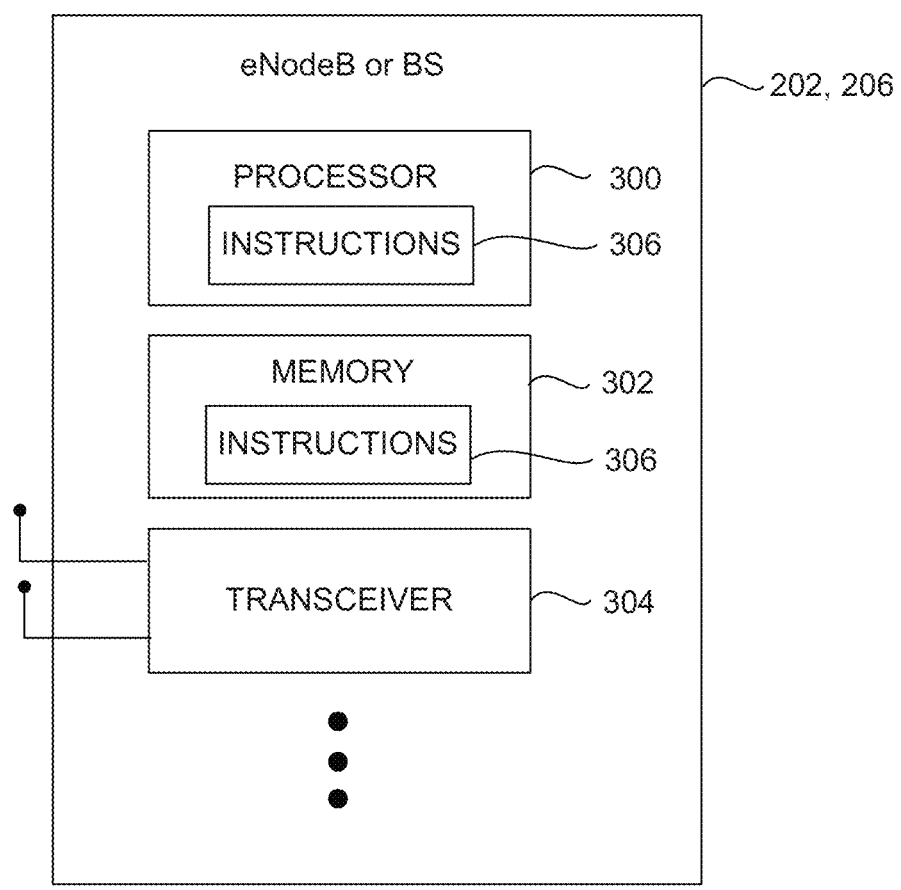
FIG. 3 illustrates an example block diagram showing details of the eNodeB included in the wireless communications network of FIG. 2 according to some embodiments.

FIG. 3 illustrates an example block diagram showing details of the first and second eNodeBs 202, 206 and/or UEs 216 according to some embodiments. Each of the first and second eNodeBs 202, 206 (and/or UEs 216) includes a processor 300, a memory 302, a transceiver 304, instructions 306, and other components (not shown). The first and second eNodeB 202, 206 (and/or UEs 216) are similar to each other in hardware, firmware, software, configurations, and/or operating parameters.

The processor 300 (also referred to as processing circuitry) comprises one or more central processing units (CPUs), graphics processing units (GPUs), or both. The processor 300 provides processing and control functionalities for the first and second eNodeBs 202, 206 (and/or UEs 216), respectively. Memory 302 comprises one or more transient and static memory units configured to store instructions and data for the first and second eNodeBs 202, 206 (and/or UEs 216), respectively. The transceiver 304 comprises one or more transceivers including a multiple-input and multiple-output (MIMO) antenna to support MIMO communications. The transceiver 304 receives uplink transmissions and transmits downlink transmissions with the UEs 216, among other things, for the first and second eNodeBs 202, 206 (and/or UEs 216), respectively.

The instructions 306 comprises one or more sets of instructions or software executed on a computing device (or machine) to cause such computing device (or machine) to perform any of the methodologies discussed herein. The instructions 306 (also referred to as computer- or machine-executable instructions) may reside, completely or at least partially, within the processor 300 and/or the memory 302 during execution thereof by the first and second eNodeBs 202, 206 (and/or UEs 216), respectively. The processor 300 and memory 302 also comprise machine-readable media.

Figure 4:
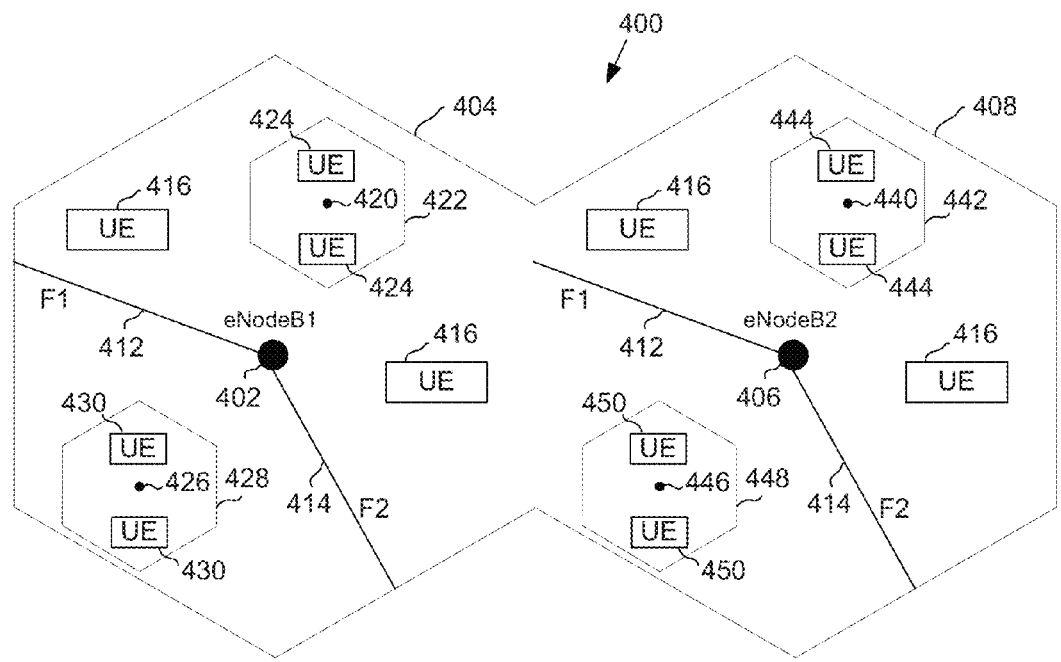
FIG. 4 illustrates an example (portion) of a wireless communication network shown in a heterogeneous network deployment according to some embodiments.

FIG. 4 illustrates an example (portion) of a wireless communication network 400 shown in a heterogeneous network deployment according to some embodiments. In one embodiment, the wireless communications network 400 comprises an EUTRAN using the 3GPP-LTE standard operating in TDD mode. The wireless communications network 400 includes a first eNodeB 402, a second eNodeB 406, short range base stations (BSs) 420, 426, 440, 446, and a plurality of user UEs 416, 424, 430, 444, 450.

The first eNodeB 402 (also referred to as eNodeB1, first base station, or first macro base station) serves a certain geographic area, denoted as a first macro cell 404. The UEs 416 located within the first macro cell 404 and associated with the first eNodeB 402 are served by the first eNodeB 402. The first eNodeB 402 communicates with the UEs 416 on a first carrier frequency 412 (F1) and optionally, one or more secondary carrier frequencies, such as a secondary carrier frequency 414 (F2). The first eNodeB 402, first macro cell 404, and UEs 416 are similar to the first eNodeB 202, first cell 204, and UEs 216, respectively.

The second eNodeB 406 is similar to the first eNodeB 402 except it serves a different cell from that of the first eNodeB 402. The second eNodeB 406 (also referred to as eNodeB2, second base station, or second macro base station) serves another certain geographic area, denoted as a second macro cell 408. The UEs 416 located within the second macro cell 408 and associated with the second eNodeB 406 area served by the second eNodeB 406. The second eNodeB 406 communicates with the UEs 416 on the first carrier frequency 412 (F1) and optionally, one or more secondary carrier frequencies, such as the second carrier frequency 414 (F2). The second eNodeB 406, second macro cell 408, and UEs 416 are similar to the second eNodeB 206, second cell 208, and UEs 416, respectively.

Located within the geographic area of the first macro cell 404 are one or more short range BSs, such as short range BSs 420 and 426. The short range BS 420 serves a geographic area within the first macro cell 404, denoted as a short range cell 422. UEs 424 located within the short range cell 422 and associated with the short range BS 420 are served by the short range BS 420. The short range BS 420 communicates with the UEs 424 on one or more carrier frequencies. The short range BS 426 serves a different geographic area within the first macro cell 404, denoted as a short range cell 428. UEs 430 located within the short range cell 428 and associated with the short range BS 426 are served by the short range BS 426. The short range BS 426 communicates with the UEs 430 on a different carrier frequency than the first carrier frequency 412 (F1), and optionally, one or more secondary carrier frequencies that are also different from the second carrier frequency 414 (F2).

Located within the geographic area of the second macro cell 408 are one or more short range BSs, such as short range BSs 440 and 446. The short range BS 440 serves a geographic area within the second macro cell 408, denoted as a short range cell 442. UEs 444 located within the short range cell 442 and associated with the short range BS 440 are served by the short range BS 440. The short range BS 440 communicates with the UEs 444 on a different carrier frequency than the first carrier frequency 412 (F1), and optionally, one or more secondary carrier frequencies that are also different from the second carrier frequency 414 (F2). The short range BS 446 serves a different geographic area within the second macro cell 408, denoted as a short range cell 448. UEs 450 located within the short range cell 448 and associated with the short range BS 446 are served by the short range BS 446. The short range BS 446 communicates with the UEs 450 on a different carrier frequency than the first carrier frequency 412 (F1), and optionally, one or more secondary carrier frequencies that are also different from the second carrier frequency 414 (F2).

Each of the short range cells 422, 428, 442, 448 comprises a femto cell, pico cell, or other cell defined by a base station—short, range BSs 420, 426, 440, 446, respectively—operating at a significantly lower power level and communication range in comparison to the base station of the macro cell in which it is located. The short, range BSs 420, 426, 440, 446 may operate in accordance with commands from the its macro cell base station, or it may be capable of independent operation.

The first and second macro cells 404, 408 may or may not be immediately co-located next to each other. However, the first and second macro cells 404, 408 are situated close enough to be considered neighboring cells, such that the user traffic pattern of one of the first or second eNodeB 402, 406 is relevant to the other eNodeB (and possibly the short range BSs within that eNodeB). Due to the proximity of the eNodeBs or BSs to each other, there may be BS/eNodeB-to-BS/eNodeB interference and/or UE-to-UE interference.

Each of the first eNodeB 402, second eNodeB 406, short range BS 420, short range BS 426, short range BS 440, and short range BS 446 specifies an uplink-downlink configuration from among the supported uplink-downlink configurations (shown in FIG. 1) to its associated UEs. The selected uplink-downlink configurations can be the same or different among the first eNodeB 402, second eNodeB 406, short range BS 420, short range BS 426, short range BS 440, and short range BS 446 depending on pre-determined or current operating conditions. Each of the first eNodeB 402, second eNodeB 406, short range BS 420, short range BS 426, short range BS 440, and short range BS 446 includes a processor, memory, transceiver, instructions, and other components described above in connection with FIG. 3.

The UEs 416, 424, 430, 444, 450 may comprise a variety of devices that communicate within the wireless communications network 400 including, but not limited to, cellular telephones, smart phones, tablets, laptops, desktops, personal computers, servers, personal digital assistants (PDAs), web appliances, set-top box (STB), a network router, switch or bridge, and the like. The UEs 416, 424, 430, 444, 450 can comprise Release 8, 9, 10, 11, and/or later UEs. The UEs 416, 424, 430, 444, and 450 can be similar to each other and to the UEs 216. The UEs 416, 424, 430, 444, 450 transmit and receive data with its respective BS/eNodeB in accordance with the uplink-downlink ratio configuration selected for the given BS/eNodeB. Although UEs 416, 424, 430, 444, 450 are shown associated with a respective BS/eNodeB, it is understood that any of the UEs 416, 424, 430, 444, 450 can move in or out of a given cell to another cell and be associated with a different BS/eNodeB.

It is understood that the wireless communications network 400 includes more than two eNodeBs. It is also understood that each of the first and second eNodeBs 402, 406 can have more than one neighboring eNodeB. As an example, the first eNodeB 402 may have six or more neighboring eNodeBs. It is further understood that any of the macro cells can include zero, one, two, or more short range cells within its area.

Figure 5:
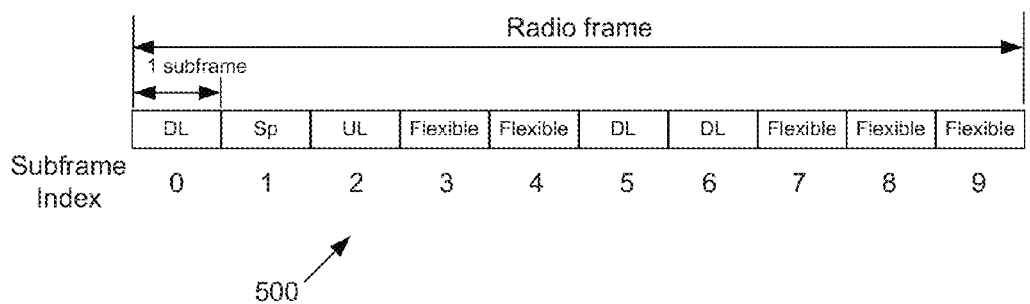
FIG. 5 illustrates a radio frame structure that supports UL/DL configuration allocation for legacy Release 8/9/10 UEs and also facilitates a dynamic UL/DL re-configuration indication mechanism for Release 11 and later UEs according to some embodiments.

FIG. 5 illustrates a radio frame structure 500 that supports UL/DL configuration allocation for legacy Release 8/9/10 UEs (in accordance with the supported UL/DL configurations shown in FIG. 1) and also facilitates a dynamic UL/DL re-configuration indication mechanism for Release 11 and later UEs according to some embodiments. The radio frame structure 500 comprises ten subframes—denoted by subframe index 0 through 9 from left to right. Subframes 0, 5, and 6 are designated as downlink subframes: Subframe 1 is designated as a special subframe; Subframe 2 is designated as an uplink subframe; and Subframes 3, 4, 7, 8, and 9 are designated as flexible subframes (FlexSFs). As described in detail below, the flexible subframes within the radio frame are designated for flexible transmission direction encoding—each of the flexible subframes can be dynamically designated a downlink or special uplink subframe for Release 11 or later UEs. The special uplink subframe includes a downlink transmission period to transmit downlink control channels, a central guard period (GP) to switch between a downlink and uplink transmission, and an uplink data transmission period. In TDD-LTE deployment, the radio frame structure 500 is 10 ms in time length and each sub frame within the radio frame structure 500 is 1 ms in time length.

Figure 6A:
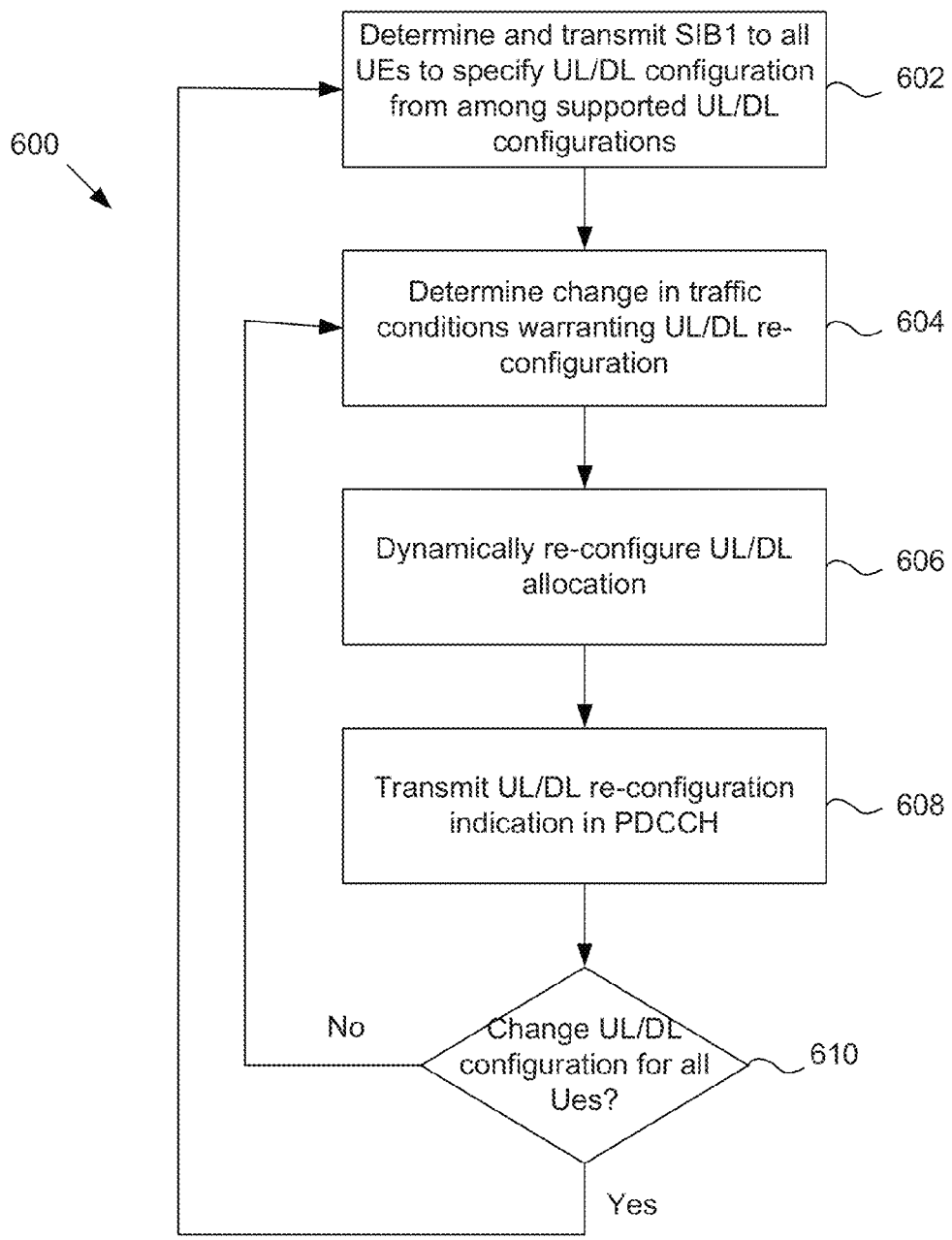
FIGS. 6A-6C illustrate an example flow diagram for dynamically adjusting the UL/DL configuration by any eNodeB or BS included in the wireless communications network of FIG. 2 or 4 according to some embodiments.
Figure 6B:
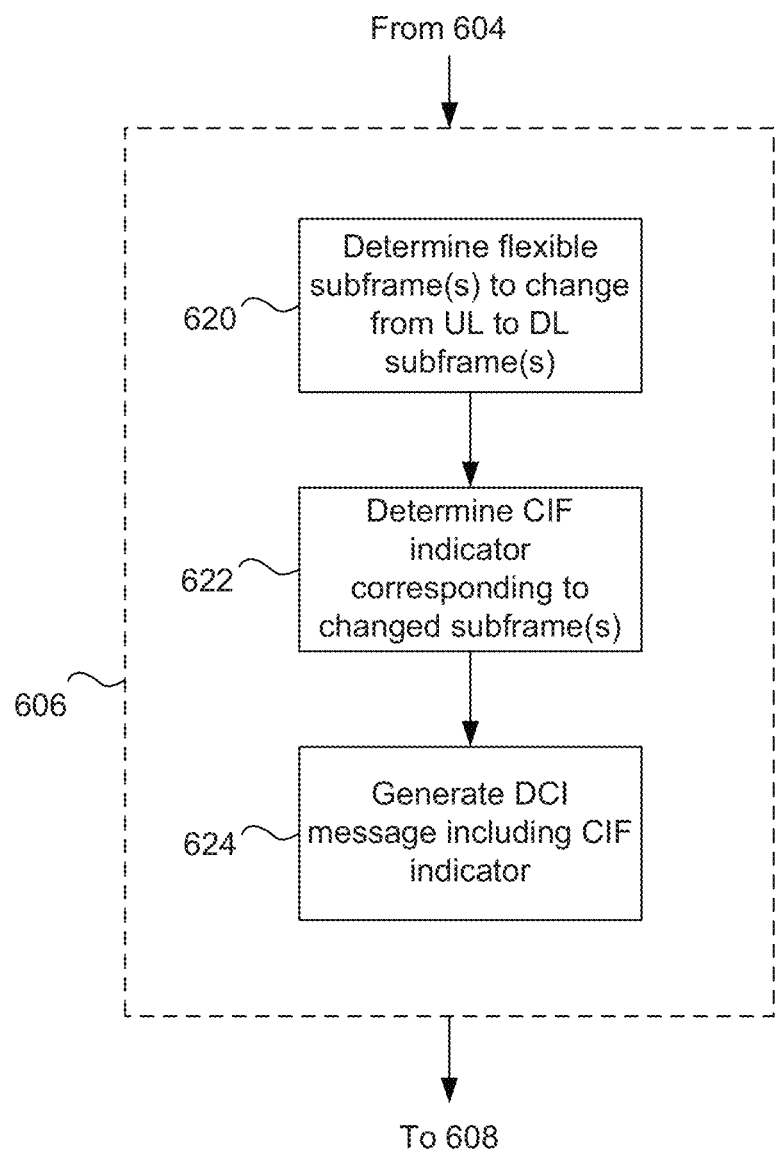
Figure 6C:
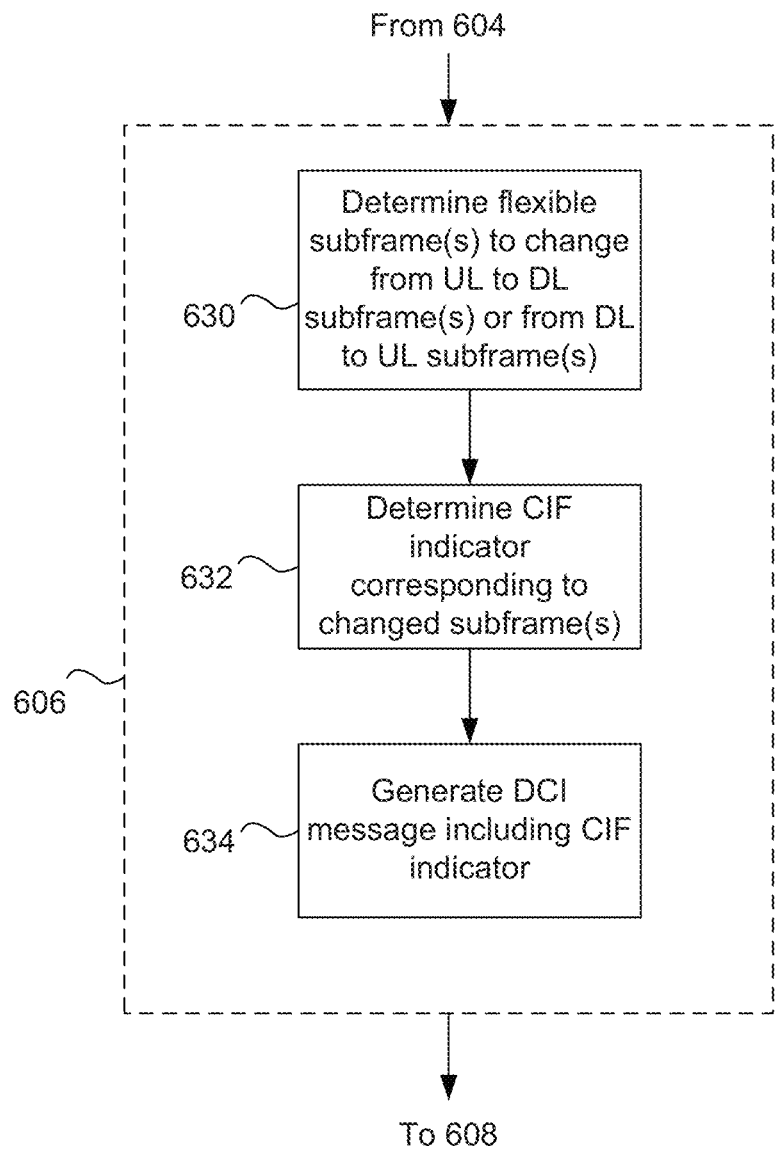

FIGS. 6A-6C illustrate an example flow diagram 600 for dynamically adjusting the UL/DL configuration for any eNodeB or BS included in the wireless communications network 200 or 400 according to some embodiments. Using the new radio frame structure 500 of FIG. 5, select flexible subframes are designated to switch from a UL subframe to a DL subframe, or vice versa, within a radio frame time period, thereby defining a new UL/DL configuration relative to the operating UL/DL configuration allocated via SIB1. The new UL/DL configuration is indicated using a new DCI message transmitted in the PDCCH. The discussion below is made with respect to first eNodeB 202 and UEs 216; however, it is understood that any BS or eNodeB within the wireless communications network 200 or 400 (e.g., first eNodeB 202, second eNodeB 206, first eNodeB 402, second eNodeB 406, short range BS 420, short range BS 426, short range BS 440, short range BS 446) can perform the process shown in flow diagram 600.

At a block 602, the first eNodeB 202 determines and transmits allocation of an (initial) UL/DL configuration ratio from among the supported UL/DL configuration ratios (see FIG. 1) via the SIB1 (or a system information data block). The SIB1 message is broadcast to all the UEs 216 within the first cell 204. Upon receipt of the SIB1 message, and included within it the specification of a particular UL/DL configuration, by the UEs 216 (e.g., the legacy Release 8/9/10 UEs and Release 11 or later UEs), the UEs know when to transmit data to the first eNodeB 202 and when to receive data from the eNodeB 202. This UL/DL configuration allocation is also referred to as the legacy UL/DL configuration or first UL/DL configuration.

Next at a block 604, the first eNodeB 202 monitors in real-time or near real-time traffic conditions associated with the UEs 216 within its first cell 204, possible interference from other BSs or eNodeBs, and other parameters relevant to determining whether a UL/DL re-configuration is warranted. For instance, a number of UEs associated with the first eNodeB 202 may be requesting high definition (HD) movies from online movie providers, thus creating a high downlink traffic load for the first cell 204. Such material change in the traffic load since the current UL/DL configuration was selected may benefit from changing to a different UL/DL configuration having more downlink subframes in order to more effectively meet the downlink demands.

When the first eNodeB 202 determines that a UL/DL re-configuration is desired, the first eNodeB 202 dynamically performs a UL/DL re-configuration in accordance with a UL/DL re-configuration mechanism at a block 606. Details of the UL/DL re-configuration mechanism or scheme are discussed in detail below with respect to FIGS. 6B and 6C. The UL/DL re-configuration comprises a UL/DL configuration different from the UL/DL configuration allocated in block 602. The UL/DL re-configuration allocation is detectable by certain types of UEs within the first cell 204 (e.g., Release 11 or later UEs) but not by other types of UEs within the first cell 204 (e.g., Release 8/9/10 legacy UEs). For those UEs unable to detect the UL/DL re-configuration allocation, such UEs continue to operate in accordance with the UL/DL configuration allocation of block 602. The UL/DL re-configuration is configured to maintain backward compatibility for those UEs unable to detect and/or operate in accordance with the new allocation.

The legacy UEs are unaware of the UL/DL re-configuration due to, for example, use of a new indication format not recognized by the legacy UEs. Thus the legacy UEs continue to operate in accordance with the UL/DL configuration allocation from block 602 while the Release 11 or later UEs operate in accordance with the UL/DL re-configuration allocation from block 606. This may result in some performance degradation for the legacy UEs, but the overall instantaneous traffic conditions within the first cell 204 are handled more effectively with the UL/DL re-configuration than without.

Then at a block 608, an identifier of the dynamically re-configured UL/DL allocation is transmitted (e.g., broadcast) by the first eNodeB 202 to the UEs 216 within the first cell 204 (or at least those UEs capable of detecting the new allocation). The identification of the dynamically re-configured UL/DL allocation is specified in a configuration indication field (CIF) included in a downlink control information (DCI) message, the DCI message being included in the Physical Downlink Control Channel (PDCCH), and the PDCCH being included in one or more downlink subframes of the radio frames configured according to the existing UL/DL configuration (e.g., as set forth in block 602). The DCI message also includes scheduling or hybrid automatic repeat request (HARQ) timing information associated with the UL/DL re-configuration.

The first eNodeB 202 also monitors whether the UL/DL configuration (determined in block 602) should be changed at a block 610. Even if a UL/DL re-configuration has occurred, it may be beneficial to also update the UL/DL configuration via SIB1. For example, if there are mostly legacy UEs within the first cell 204 and/or the increase in downlink demand is coming from the legacy UEs, a UL/DL re-configuration may not address the traffic load change since the legacy UEs don't recognize the UL/DL re-configuration. In other words, depending on the mix of UEs within the first cell 204 or the particular traffic conditions, a global change to the UL/DL configuration that effects all the UEs within the first cell 204 can be implemented rather than the selective change provided by a UL/DL re-configuration.

If the UL/DL configuration is maintained as is (no branch of block 610), then the flow diagram 600 returns to block 604 to determine if a UL/DL re-configuration should occur. Otherwise if a UL/DL configuration change is desired (yes branch of block 610), then the flow diagram 600 returns to block 602 to determine and transmit a subsequent UL/DL configuration selected from among the supported UL/DL configurations via SIB1.

FIG. 6B illustrates sub-blocks of block 606 detailing dynamic UL/DL re-configuration according to one embodiment. At a sub-block 620, the first eNodeB 202 determines which flexible subframe(s) within the radio frame to change (or re-configure) from UL subframe(s) to DL subframe(s). In this embodiment, (1) one or more of the subframes within the radio frame of the legacy UL/DL configuration that is designated a flexible subframe according to the radio frame structure 500 (e.g., Subframes 3, 4, 7, 8, and/or 9), and (2) which is designated as a UL subframe in the legacy UL/DL configuration is a candidate to be dynamically re-configured to a DL subframe. The following design principles are implemented to define dynamically re-configuring select flexible subframes into pre-defined patterns in a unidirectional mode:

One or more UL subframe in a radio frame of a legacy UL/DL configuration (e.g., a supported configuration indicated by SIB1) that is designated a flexible subframe (e.g., Subframe 3, 4, 7, 8, or 9) can be changed to a DL subframe. This ensures no negative impact on the common reference signal (CRS)-based measurement accuracy of legacy UEs.

And, the new UL/DL configuration corresponding to the UL flexible subframe(s) changed to DL subframe(s) (also referred to as the UL/DL re-configuration pattern, UL/DL re-configuration, or a new UL/DL configuration of frame structure type 2 (FS2)) comprises a supported UL/DL configuration shown in FIG. 1. No new UL/DL configuration patterns are generated due to the dynamic reconfiguration, in order to avoid defining new hybrid automatic repeat request (HARQ)-timing relationship for both physical downlink shared channel (PDSCH) and physical uplink shared channel (PUSCH) transmissions.

Figure 7:
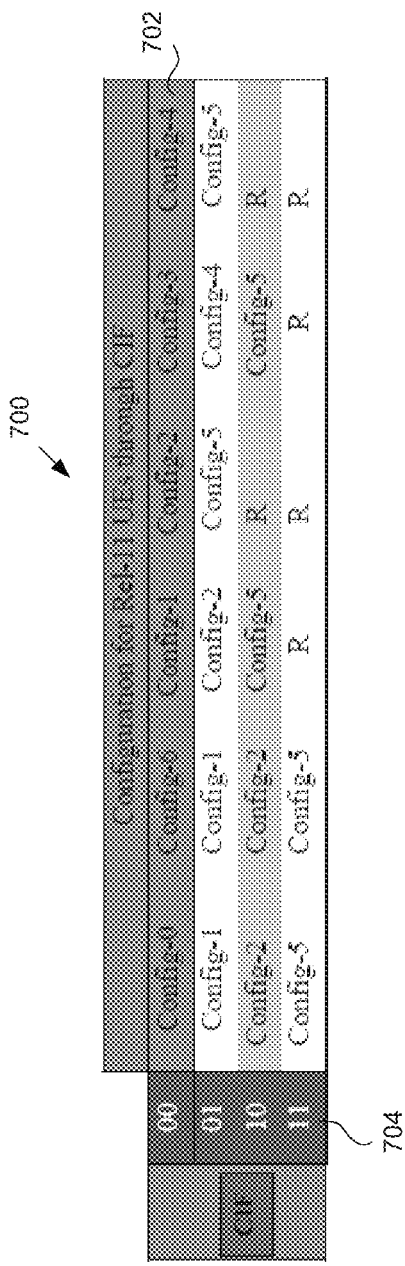
FIG. 7 lists the possible UL/DL re-configuration patterns corresponding to each of a given legacy UL/DL configuration according to some embodiments.

Based on these principles, up to three UL/DL re-configuration patterns are possible for a given legacy UL/DL configuration. Table 700 shown in FIG. 7 lists the possible UL/DL re-configuration patterns corresponding to each of a given legacy UL/DL configuration. Table 700 includes a row 702 that provides the legacy UL/DL configurations—the UL/DL configurations specified via SIB1 to all the UEs (including the Rel-8/9/10 UEs and Rel-11 or later UEs) in the first cell 204 by the first eNodeB 202 at the block 602. Below each legacy UL/DL configuration (e.g., each column in table 700) are the possible UL/DL re-configuration patterns corresponding to the particular legacy UL/DL configuration. The configuration numbers in table 700 correspond to the configuration numbers in the leftmost column of table 100 in FIG. 1. "R" denotes being reserved for future use. Table 700 also includes a column 704 providing two-bit configuration indication field (CIF) values to define or signal the particular UL/DL re-configuration for a given legacy UL/DL configuration. Note that based on the above principles, none of the supported UL/DL re-configuration patterns in table 700 is a new UL/DL configuration—none are outside the existing supported UL/DL configurations defined in FIG. 1. Also note that all of the supported UL/DL re-configuration patterns are limited to UL/DL configurations with the same number of switch points (between DL/UL or UL/DL). This reduces the control overhead needed for signaling the latest configuration recognizable by Rel-11 or later UEs.

With knowledge of the current legacy UL/DL configuration (from block 602), the first eNodeB 202 selects a UL/DL re-configuration from among the supported UL/DL re-configurations corresponding to the current legacy UL/DL configuration in table 700. The first eNodeB 202 determines a particular one of the UL/DL re-configuration patterns based on the traffic condition requirements. Once the particular one of the UL/DL re-configuration is selected in light of the current legacy UL/DL configuration, the first eNodeB 202 obtains the CIF value corresponding to the selected UL/DL re-configuration from table 700 (block 622).

Figure 8:
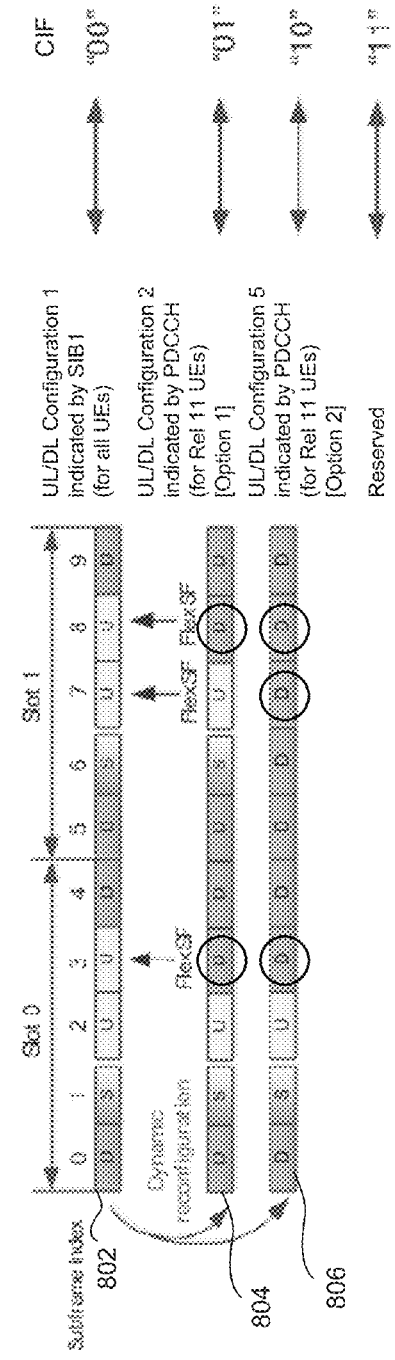
FIG. 8 illustrates an example implementation of the table of FIG. 7.

An example visual implementation of blocks 620 and 622 is illustrated in FIG. 8. In FIG. 8, the legacy UL/DL configuration indicated by SIB1 is Configuration 1, denoted as UL/DL configuration 802. The UL/DL configuration 802 (Configuration 1) is defined as CIF value "00" in table 700. According to table 700, the UL/DL re-configurations supported for UL/DL configuration 802 (Configuration 1) are: Configuration 2, Configuration 5, or Reserved. Thus, the first eNodeB 202 can dynamically re-configure UL/DL configuration 802 (Configuration 1) to either UL/DL re-configuration 804 (Configuration 2) or UL/DL re-configuration 806 (Configuration 5). If UL/DL re-configuration 804 (Configuration 2) is selected, then the corresponding OF value is "01." If UL/DL re-configuration 806 (Configuration 5) is selected, then the corresponding CIF value is "10."

In some embodiments, in order to further achieve reduction in UL/DL re-configuration signaling requirements, the CIF value may be designated as a 1-bit value ("0" or "1"). In this case the number of possible UL/DL re-configurations is reduced from that shown in table 700. A given legacy UL/DL configuration can be defined as having a CIF value "0" and it may have a single supported UL/DL re-configuration having a CIF value "1." For example, instead of legacy UL/DL configuration 802 (Configuration 1) having two UL/DL re-configuration possibilities, it may be restricted to just UL/DL re-configuration 804 (Configuration 2).

Next at a block 624, the first eNodeB 202 generates a downlink control information (DCI) message including the CIF value determined in block 622. (The CIF value is also referred to as a CIF indictor, CIF signal, or UL/DL re-configuration identifier.) A new DCI format is used for CIF transmission. In one embodiment each downlink subframes of the current UL/DL configuration includes the new DCI message. In another embodiment, a pre-defined subset of the downlink subframes of the current UL/DL configuration includes the new DCI message. To support this new DCI format, a new radio network temporary identifier (RNTI) value, named "CI-RNTI," is defined to identify the new DCI format and is used to scramble the cyclic redundancy check (CRC) parity bits of the new DCI format. The new DCI message is included in the common search space (CSS) of the PDCCH region in the downlink subframe(s). Alternatively the new DCI message is UE specific, and is transmitted on UE-specific search space (USS) of the PDCCH region in the downlink subframe(s). For the UE specific case the CRC parity bits are scrambled in accordance with an UE-specific RNTI (C-RNTI).

Figure 9:
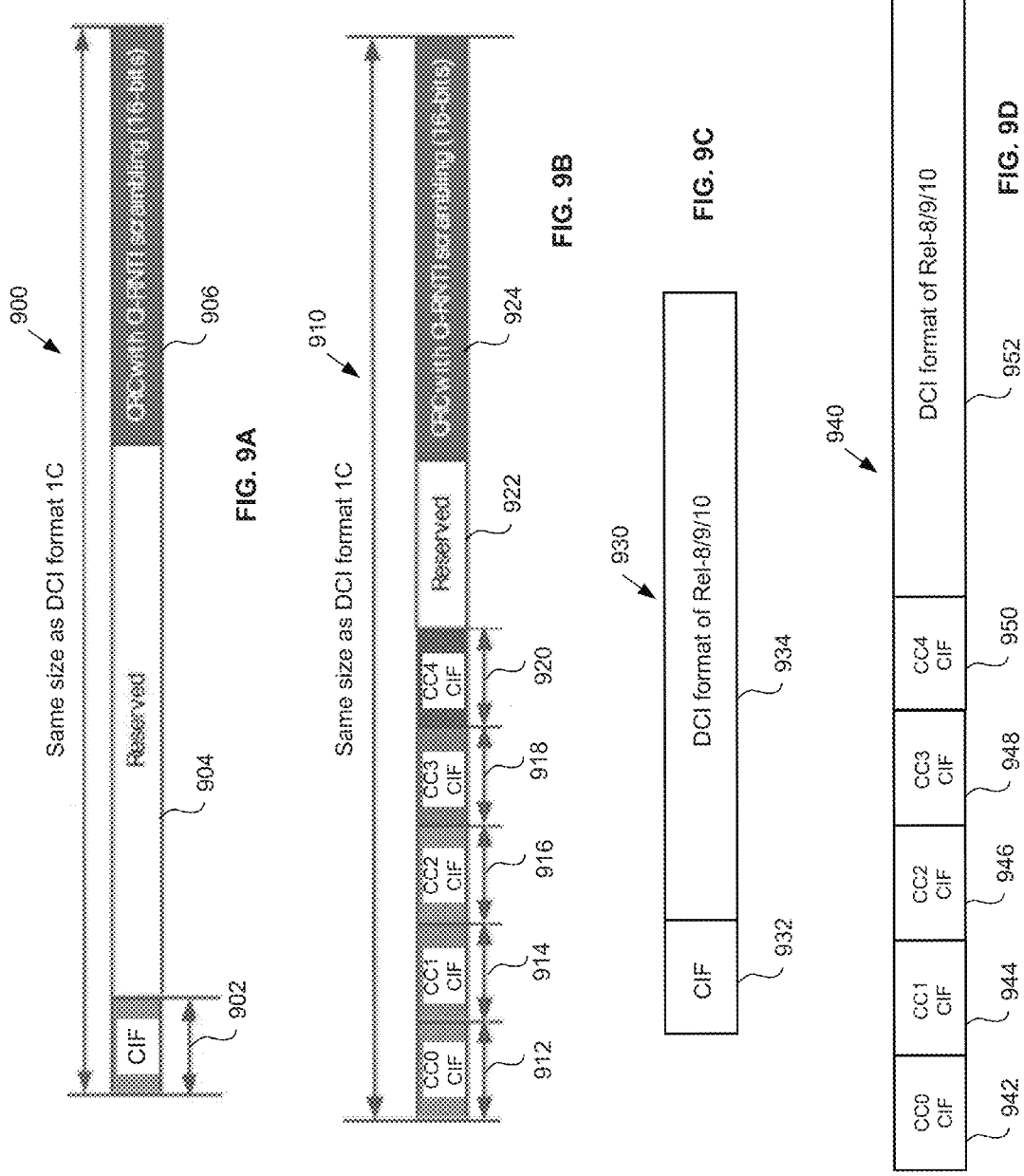
FIGS. 9A-9D illustrate embodiments of a new DCI format that includes the CIF value.

FIGS. 9A and 9B illustrate one embodiment of the new DCI format that includes the CIF value respectively for a single common carrier (CC) and a multiple CC scenario. In FIG. 9A, a DCI format 900 for single CC supporting UL/DL re-configuration comprises—from left to rightmost bits—a CIF value field 902, a reserved field 904, and a CRC with CI-RNTI scrambling field 906. The data size of DCI format 900 is the same as for DCI format 1C in the current technical specification. (See 3GPP TS 36.212 Version 10.6.0, E-UTRA Multiplexing and Channel Coding (Release 10), July 2012.) The CIF value field 902 comprises a 2-bit field, a 1-bit field, or other bit size in accordance with the CIF values identifying the supported UL/DL re-configurations. The CRC with CI-RNTI scrambling field 906 comprises a 16-bit field.

FIG. 9B illustrates a DCI format 910 for multiple CCs comprising—from left to rightmost bits—a CIF value field for each of the multiple CCs that support UL/DL re-configuration (e.g., a CIF value field associated with a first CC (CC0) 912, a CIF value field associated with a second CC (CC1) 914, a CIF value field associated with a third CC (CC2) 916, a CIF value field associated with a fourth CC (CC3) 918, a CIF value field associated with a fifth CC (CC4) 920), a reserved field 922, and a CRC with CI-RNTI scrambling field 924. The data size of DCI format 910 is the same as for DCI format 1C in the current technical specification. (See 3GPP TS 36.212 Version 10.6.0, E-UTRA Multiplexing and Channel Coding (Release 10), July 2012.)

Each of the CIF value fields 912, 914, 916, 918, 920 comprises a 2-bit field, a 1-bit field, or other bit size in accordance with the CIF values identifying the supported UL/DL re-configurations. The CRC with CI-RNTI scrambling field 924 comprises a 16-bit field.

FIGS. 9C and 9D illustrate another embodiment of the new DCI format that includes the CIF value respectively for a single CC and a multiple CC scenario. The DCI message configured in the new DCI format is transmitted in the UE-specific search space of the PDCCH region of the downlink subframes. In FIG. 9C, a DCI format 930 for single CC supporting UL/DL re-configuration comprises a CIF value field 932 and a conventional DCI format field 934. The CIF value field 932 pads or appends the existing DCI format used for Rel-8/9/10 UEs, such as DCI format 1, 1A, 2, or 2A. The CIF value field 932 comprises a 2-bit field, a 1-bit field, or other bit size in accordance with the CIF values identifying the supported UL/DL re-configurations.

FIG. 9D illustrates a DCI format 940 for multiple CCs comprising a CIF value field for each of the multiple CCs that support UL/DL re-configuration (e.g., a CIF value field associated with a first CC (CC0) 942, a CIF value field associated with a second CC (CC1) 944, a CIF value field associated with a third CC (CC2) 946, a CIF value field associated with a fourth CC (CC3) 948, a CIF value field associated with a fifth CC (CC4) 950) and a conventional DCI format field 952. The CIF value fields 942-950 pads or appends the existing DCI format used for Rel-8/9/10 UEs, such as DCI format 1, 1A, 2, or 2A. Each of the CIF value fields 942-950 comprises a 2-bit field, a 1-bit field, or other bit size in accordance with the CIF values identifying the supported UL/DL re-configurations.

FIG. 6C illustrates sub-blocks of block 606 detailing dynamic UL/DL re-configuration according to an alternate embodiment. At a sub-block 630, the first eNodeB 202 determines which flexible subframe(s) within the radio frame to change (or re-configure) from UL subframe(s) to DL subframe(s) and/or from DL subframe(s) to UL subframe(s). In this embodiment, one or more of the subframes within the radio frame of the legacy UL/DL configuration that is designated a flexible subframe according to the radio frame structure 500 (e.g., Subframes 3, 4, 7, 8, and/or 9) is a candidate to be dynamically re-configured to a UL subframe or a DL subframe. The following design principles are implemented to define dynamically re-configuring select flexible subframes into pre-defined patterns in a bidirectional mode:

One or more of the subframes in a radio frame of a legacy UL/DL configuration (e.g., a supported configuration indicated by SIB1) that are designated as a flexible subframe (e.g., Subframe 3, 4, 7, 8, or 9) can be changed from a UL to DL subframe or from DL to UL subframe. This ensures no negative impact on the CRS-based measurement accuracy of legacy UEs.

For DL flexible subframes dynamically switched to a UL subframe, the control region of the subframe remains unchanged as a DL control region to maintain measurement accuracy and backward compatibility with Rel-8/9/10 UEs (even though the data region of such subframe has been switched to a UL data region).

Figure 10:
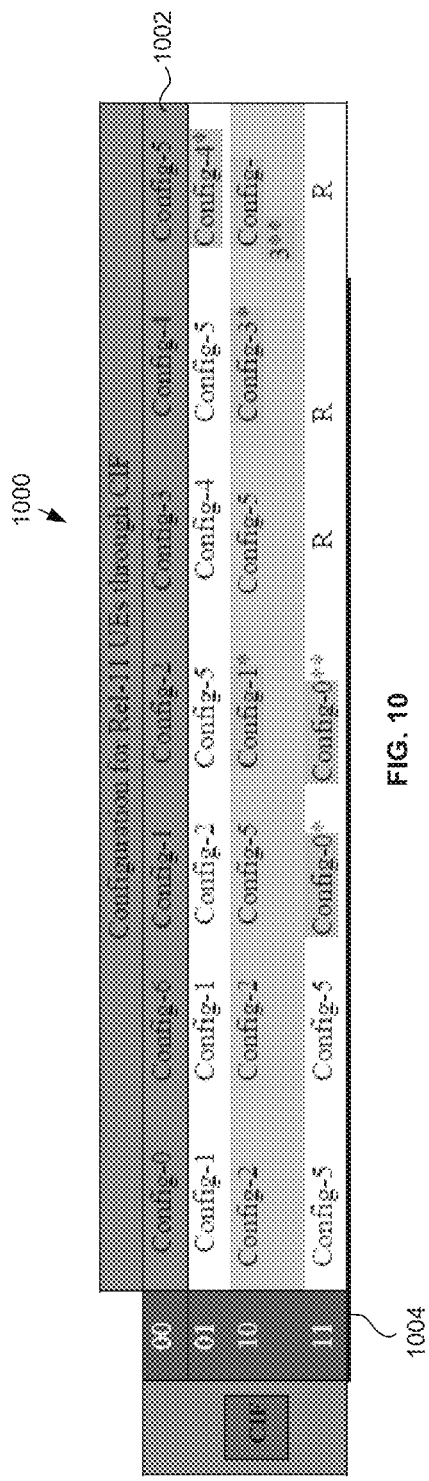
FIG. 10 lists the possible UL/DL re-configuration patterns corresponding to each of a given legacy UL/DL configuration according to another embodiment.

Based on these principles, up to three UL/DL re-configuration patterns are possible for a given legacy UL/DL configuration. Table 1000 shown in FIG. 10 lists the possible UL/DL re-configuration patterns corresponding to each of a given legacy UL/DL configuration. Table 1000 comprises the UL/DL re-configuration patterns defined in table 700 and extends to include UL/DL re-configuration patterns that are different and new from the seven supported UL/DL configurations under the current technical specification. The layout of table 1000 is similar to that of table 700.

Figure 11:
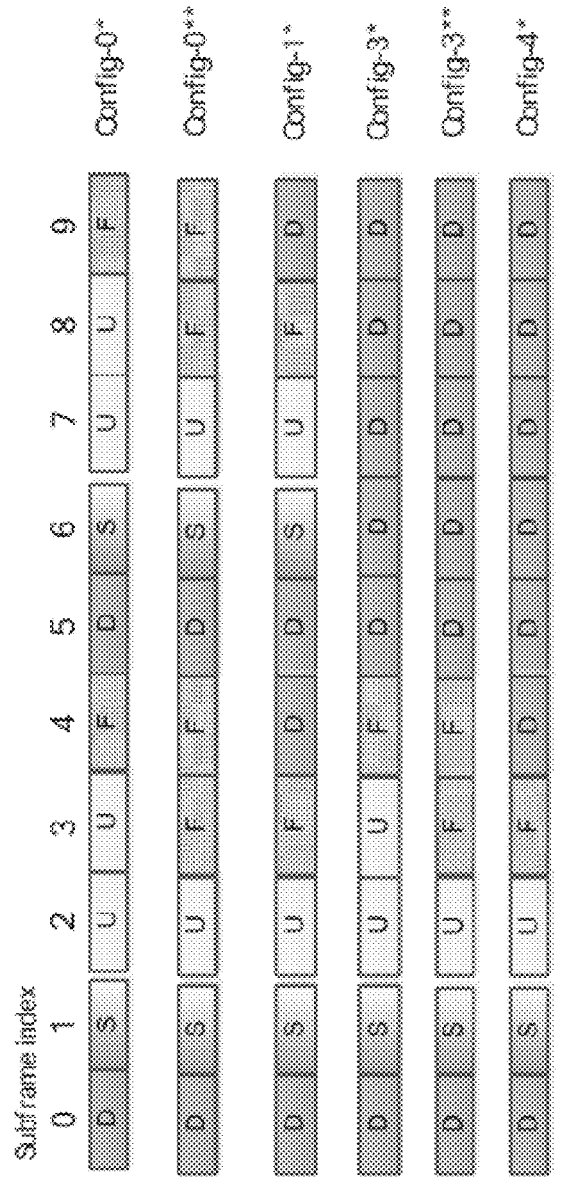
FIG. 11 illustrates the frame structures of new UL/DL configurations included in the table of FIG. 10.

Table 1000 includes a row 1002 that provides the legacy UL/DL configurations that are specified via SIB1 to all the UEs (including the Rel-8/9/10 UEs and Rel-11 or later UEs) in the first cell 204 by the first eNodeB 202 at the block 602. Below each legacy UL/DL configuration (e.g., each column in table 1000) are the possible UL/DL re-configuration patterns corresponding to that particular legacy UL/DL configuration. The configuration numbers in table 1000 correspond to the configuration numbers in the leftmost column of table 100 in FIG. 1. "R" denotes being reserved for future use. Table 1000 also includes a column 1004 providing two-bit CIF values to define or signal the particular UL/DL re-configuration for a given legacy UL/DL configuration. Note that all of the supported UL/DL re-configuration patterns are limited to UL/DL configurations with the same number of switch points (between DL/UL or UL/DL). This reduces the control overhead needed for signaling the latest configuration recognizable by Rel-11 or later UEs. The configurations within table 1000 marked with "*" or "" are new UL/DL configurations relative to the current technical specification. FIG. 11 illustrates the frame structures of these new UL/DL configurations. The subframes marked "F" in FIG. 11** are DL (flexible) subframes that were dynamically switched using CIF to special UL subframes.

With knowledge of the current legacy UL/DL configuration (from block 602), the first eNodeB 202 selects a UL/DL re-configuration from among the supported UL/DL re-configurations corresponding to the current legacy UL/DL configuration in table 1000. The first eNodeB 202 determines a particular one of the UL/DL re-configuration patterns based on the traffic condition requirements. Once the particular one of the UL/DL re-configuration is selected in light of the current legacy UL/DL configuration, the first eNodeB 202 obtains the CIF value corresponding to the selected UL/DL re-configuration from table 1000 (block 632).

In some embodiments, in order to further achieve reduction in UL/DL re-configuration signaling requirements, the CIF value may be designated as a 1-bit value ("0" or "1"). In this case the number of possible UL/DL re-configurations for a given legacy UL/DL configuration is reduced from that shown in table 1000. A given legacy UL/DL configuration can be defined as having a CIF value "0" and it may have a single supported UL/DL re-configuration having a CIF value "1."

Next at a block 634, the first eNodeB 202 generates a DCI message including the CIF value determined in block 632. A new DCI format is used for CIF transmission. The new DCI message is included in the CSS of the PDCCH region in the downlink subframes and/or control regions of uplink subframes that were dynamically switched from downlink subframes. In one embodiment each downlink subframes of the current UL/DL configuration includes the new DCI message. In another embodiment, a pre-defined subset of the downlink subframes of the current UL/DL configuration includes the new DCI message. To support this new DCI format, a new RNTI value, named "CI-RNTI," is defined to identify the new DCI format and is used to scramble the cyclic redundancy check (CRC) parity bits of the new DCI format. The same DCI formats discussed above with respect to FIGS. 9A-9D can be used, with the appropriate CIF values defined in table 1000, to generate the DCI message.

Figure 6D:
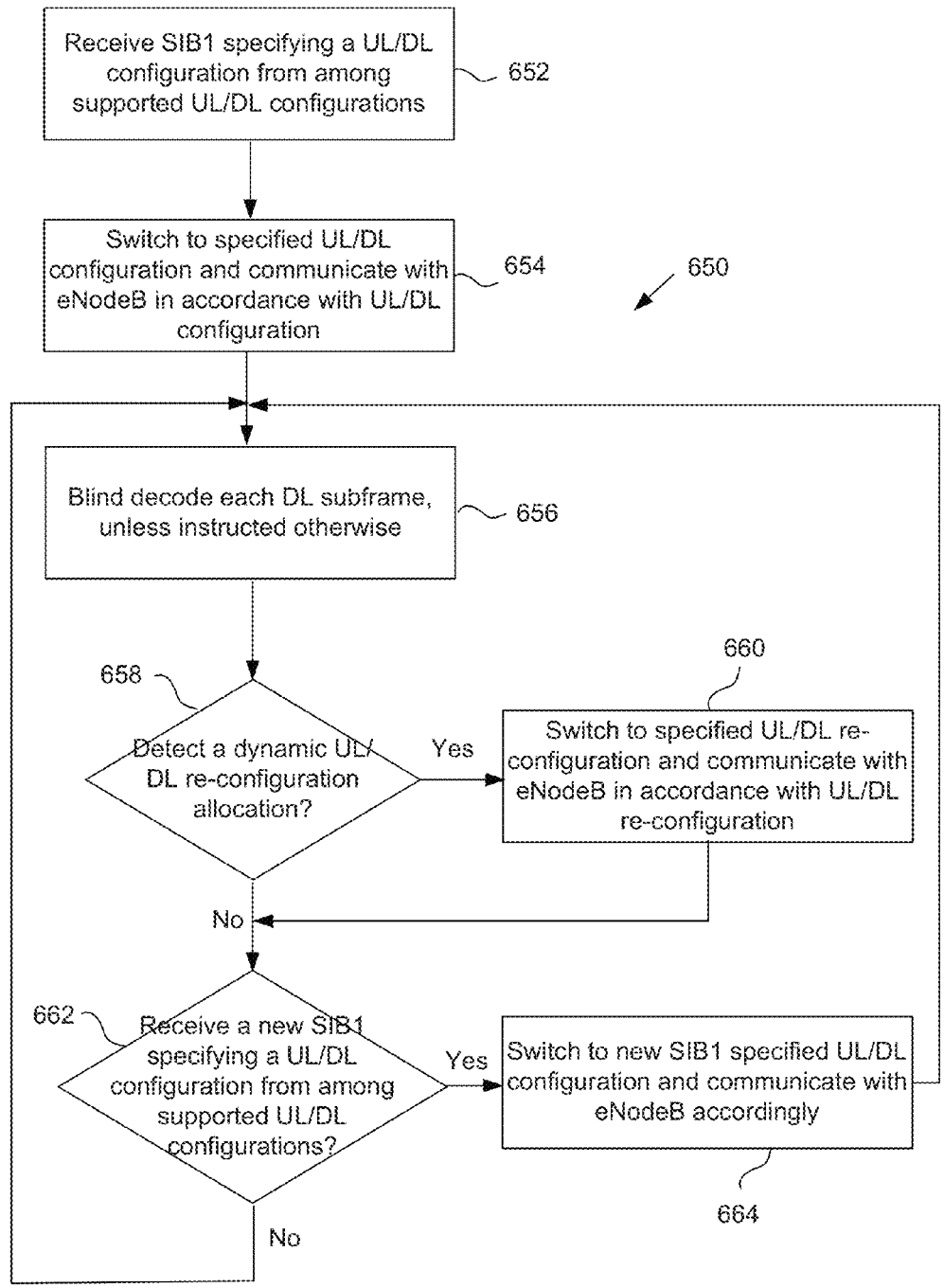
FIG. 6D illustrates an example flow diagram of operations performed by a UE in response to transmissions of UL/DL configuration allocation information by an eNodeB or BS according to some embodiments.

FIG. 6D illustrates an example flow diagram 650 of operations performed by a UE in response to transmissions of UL/DL configuration allocation information by an eNodeB or BS according to some embodiments. At a block 652, a UE receives SIB1 information transmitted by the eNodeB associated with the UE. The SIB1 specifies a UL/DL configuration allocation selected from among the supported UL/DL configurations, as described above with respect to block 602 of FIG. 6A. In response, the UE switches to the UL/DL configuration specified in SIB1 and going forward communicates with the eNodeB according to that configuration (block 654).

While operating in the currently specified UL/DL configuration, the UE blind decodes each received downlink subframe unless instructed otherwise at a block 656. For example, if dynamic UL/DL re-configuration allocation is configured to be transmitted in uplink subframe(s), then the UE is correspondingly configured to blind decode one or more uplink subframes to detect a possible re-configuration allocation. Based on the blind decoded information, certain UEs can detect whether a dynamic UL/DL re-configuration allocation has been specified. The UE receives the transmission of the UL/DL re-configuration indication from the eNodeB, as described above with respect to block 608 of FIG. 6A. If the CIF value is recognized by the UE, then the UE can determine whether and which re-configuration allocation has been specified by the eNodeB. The UE can be a type of UE capable of detecting changes in the UL/DL configuration via a specification scheme other than SIB1, such as Release 11 or later UEs.

If the UE is capable of detecting dynamic re-configurations and a re-configuration allocation is detected (yes branch of block 658), then the UE switches to the specified re-configuration allocation (from the SIB1 specified configuration) and then proceeds to operate in accordance with the UL/DL re-configuration, including following the scheduling or HARQ timing provided in the downlink subframe (s). Because the eNodeB can also transmit a new SIB1 that specifies a certain UL/DL configuration, the UE checks for such a new SIB1 at a block 662 after switching to the non-SIB1 specified configuration at the block 660.

If the UE is not capable of detecting dynamic re-configurations (e.g., a Release 8/9/10 legacy UE or a malfunctioning Release 11 or later UE) or no re-configuration is specified (no branch of block 658), then a check for a different UL/DL configuration specified via a new SIB1 is performed at the block 662. If there is no such specification (no branch of block 662), then the UE continues to blind decode the downlink subframes at the block 656. Otherwise the new SIB1 received by the UE provides for a different UL/DL configuration (yes branch of block 662), and the UE switches to that UL/DL configuration at a block 664.

Flow diagram 650 can be performed by each UE associated with a given eNodeB within the wireless communications network.

With both unidirectional and bidirectional dynamic re-configuration, the Rel-11 or later UEs associated with the first eNodeB 202 detect the latest UL/DL configuration dynamically (e.g., from radio frame to radio frame) via CIF signaling and accordingly follow the HARQ-ACK timing of the new configuration. The Rel-8/9/10 UEs are unable to detect this change in the UL/DL configuration and continue to operate according to the UL/DL configuration allocation transmitted through the SIB1. The first eNodeB 202 is operable to properly schedule data transmission of Rel-8/9/10 UEs and makes sure that the corresponding PUSCH resources and HARQ-ACK resources of PDSCH and PUSCH (and other Rel-8/9/10 measurement accuracy requirements defined in 3GPP TS 36.101 Version 10.4.0, E-UTRA User Equipment (UE) Radio Transmission and Reception (Release 10), November 2011) are still valid even when certain of the flexible subframes are dynamically changed for the new release UEs.

Accordingly, an encoding scheme for dynamically adjusting the UL/DL configuration in a LTE-TDD network is disclosed. Each eNodeB transmits a first UL/DL configuration allocation in a SIB1 message for each carrier frequency served by that eNodeB. The first UL/DL configuration comprises the operating UL/DL configuration for all UEs associated with the eNodeB, including Rel-8/9/10 UEs and Rel-11 or later UEs. When the eNodeB determines that the current traffic load is inadequately handled by the first UL/DL configuration, the eNodeB dynamically adjusts the first UL/DL configuration to a second UL/DL configuration (also referred to as a UL/DL re-configuration). The second UL/DL configuration allocation is transmitted to the UEs in a DCI message mapped to the PDCCH. The second UL/DL configuration is detected by the Rel-11 and later UEs, and such UEs change communication with the eNodeB accordingly. The second UL/DL configuration is not detectable by legacy UEs, such as Rel-8/9/10 UEs. The legacy UEs continue to operate in accordance with the first UL/DL configuration. The second UL/DL configuration is thus designed to maintain backward compatibility with legacy UEs, minimize control overhead, satisfy instantaneous traffic situation requirements, and reduce configuration change latency from a minimum of approximately 640 ms to less than 640 ms, such as approximately 10 ms, less than 10 ms, or a radio frame time period.

The term "machine-readable medium," "computer readable medium," and the like should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

It will be appreciated that, for clarity purposes, the above description describes some embodiments with reference to different functional units or processors. However, it will be apparent that any suitable distribution of functionality between different functional units, processors or domains may be used without detracting from embodiments of the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. One skilled in the art would recognize that various features of the described embodiments may be combined in accordance with the invention. Moreover, it will be appreciated that various modifications and alterations may be made by those skilled in the art without departing from the scope of the invention.

The Abstract of the Disclosure is provided to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A non-transitory computer readable medium comprising instructions that, when executed by one or more processors of a user equipment (UE), configure the UE to perform operations for dynamically changing an uplink and downlink frame structure configuration, the operations comprising:
    transmitting, by an evolved Node B (eNodeB), a System Information Block Type 1 (SIB1) including first uplink and downlink subframe configuration information; and
    transmitting, by the eNodeB, in at least one downlink subframe of a radio frame configured in the first uplink and downlink subframe configuration, second uplink and downlink subframe configuration information, the second uplink and downlink subframe configuration information included in a downlink control information (DCI) message and the DCI message being included in the at least one downlink subframe of the radio frame for dynamically changing the uplink and downlink frame structure configuration from the first uplink and downlink subframe configuration information of the SIB1 to the second uplink and downlink subframe configuration of the DCI message.

2. The non-transitory computer readable medium of claim 1, wherein the DCI message is included in each downlink subframe of the radio frame configured in the first uplink and downlink subframe configuration or a pre-defined subset of the downlink subframes of the radio frame configured in the first uplink and downlink subframe configuration.

3. The non-transitory computer readable medium of claim 1, wherein the DCI message includes one or more uplink/downlink configuration indication values specifying the second uplink and downlink subframe configuration for each of respective one or more component carriers associated with the eNodeB.

4. The non-transitory computer readable medium of claim 3, wherein a CIF value comprises a 2-bit value to specify up to four different uplink and downlink subframe configurations.

5. The non-transitory computer readable medium of claim 3, wherein the CIF value comprises a 1-bit value to specify up to two different uplink and downlink subframe configurations.

6. The non-transitory computer readable medium of claim 1, wherein the DCI message includes cyclic redundancy check (CRC) parity bits that are scrambled in accordance with a radio network temporary identifier (RNTI) identifying DCI messages configured to allocate the second uplink and downlink subframe configuration, and wherein the RNTI is configured to fix identify for broadcast of the second uplink and downlink subframe configuration, the RNTI known a priori to user equipment (UEs).

7. The non-transitory computer readable medium of claim 1, wherein the DCI message is included in a common search space (CSS) of a physical downlink control channel (PDCCH) included in the at least one downlink subframe of the radio frame configured in the first uplink and downlink subframe configuration, and wherein a size of the DCI message is extended by padding bits to be a same size as one of DCI formats of a 3rd Generation Partnership Project (3GPP) long term evolution (LTE) Release 8/9/10 network.

8. The non-transitory computer readable medium of claim 1, wherein the DCI message is included in a user equipment (UE)-specific search space (USS) of a physical downlink control channel (PDCCH) included in the at least one downlink subframe of the radio frame configured in the first uplink and downlink subframe configuration.

9. The non-transitory computer readable medium of claim 1, wherein the eNodeB is configured to operate in accordance with a 3rd Generation Partnership Project (3GPP) long term evolution (LTE) network, and the radio frame comprises an orthogonal frequency-division multiple access (OFDMA) frame configured for time division duplex (TDD) operation.

10. The non-transitory computer readable medium of claim 1 wherein the operations further comprise:
    initiating transmission, by the eNodeB, within a radio frame time period of transmission of the at least one downlink subframe, a second subframe configured in the second uplink and downlink subframe configuration.

11. An apparatus of a user equipment (LTE) operating in a wireless communications network and configured for dynamic uplink and downlink configuration of a frame structure, the apparatus comprising:
    circuitry to receive a system information data block comprising a System information Block Type 1 including a first uplink and downlink configuration from a base station and to subsequently receive in at least one downlink subframe of a radio frame configured in the first uplink and downlink configuration, second uplink and downlink configuration information provided in a downlink control information (DCI) format; and
    processing circuitry to blind decode each received downlink subframe, including the at least one downlink subframe, to detect the second uplink and downlink configuration information and to initiate a dynamic changing of the uplink and downlink frame structure configuration from the first uplink and downlink subframe configuration of the S1131 to the second uplink and downlink subframe configuration of the DCI message.

12. The apparatus of claim 11, wherein the wireless communications network in which the UE operates comprises a 3rd Generation Partnership Project (3GPP) long term evolution (LTE) network.

13. The apparatus of claim 11, wherein the DCI format is included in a common search space (CSS) of a physical downlink control channel (PDCCH) included in the at least one downlink subframe of the radio frame configured in the first uplink and downlink configuration.

14. The apparatus of claim 11, wherein the DCI message is included in a user equipment (UE)-specific search space (USS) of a physical downlink control channel (PDCCH) included in the at least one downlink subframe of the radio frame configured in the first uplink and downlink configuration.

15. The apparatus of claim 11, wherein the UE switches from the first uplink and downlink configuration to the second uplink and downlink configuration in response to detecting the DCI format indicating the second uplink and downlink configuration.

16. The apparatus of claim 11, wherein the processing circuitry maintains operating the UE in the first uplink and downlink configuration in response to an inability to recognize the DCI format indicating the second uplink and downlink configuration.

17. The apparatus of claim 11, wherein a particular radio frame structure of the second uplink and downlink configuration is specified by a configuration number included in the DCI format.

18. The apparatus of claim 17, wherein each of the first and second uplink and downlink configurations has a radio frame structure comprising ten subframes, each of the ten subframes designated as a special subframe (S), an uplink subframe (U), a downlink subframe (D), or a flexible subframe (F).

19. The apparatus of claim 18, wherein the radio frame structure of the first uplink and downlink configuration comprises DSUUUDSUUU and the radio frame structure of the second uplink and downlink configuration comprises DSUUDDSUUD, DSUDDDSUDD, or DSUDDDDDDD, each of the radio frame structures being associated with a different CIF value from each other.

20. The apparatus of claim 18, wherein the radio frame structure of the first uplink and downlink configuration comprises DSUUUDSUUD and the radio frame structure of the second uplink and downlink configuration comprises DSUUDDSUUD, DSUDDDSUDD, or DSUDDDDDDD, each of the radio frame structures being associated with a different CIF value from each other.

21. The apparatus of claim 18, wherein the radio frame structure of the first uplink and downlink configuration comprises DSUUDDSUUD and the radio frame structure of the second uplink and downlink configuration comprises DSUDDDSUDD, DSUDDDDDDD, or DSUUFDSUUF, each of the radio frame structures being associated with a different CIF value from each other.

22. The apparatus of claim 18, wherein the radio frame structure of the first uplink and downlink configuration comprises DSUDDDSUDD and the radio frame structure of the second uplink and downlink configuration comprises DSUDDDDDDD, DSUFDDSUFD, or DSUFFDSUFF, each of the radio frame structures being associated with a different CIF value from each other.

23. The apparatus of claim 18, wherein the radio frame structure of the first uplink and downlink configuration comprises DSUDDDDDDD and the radio frame structure of the second uplink and downlink configuration comprises DSUUDDDDDD or DSUDDDDDDD, each of the radio frame structures being associated with a different CIF value from each other.

24. The apparatus of claim 18, wherein the radio frame structure of the first uplink and downlink configuration comprises DSUUDDDDDD and the radio frame structure of the second uplink and downlink configuration comprises DSUDDDDDDD or DSUUFDDDDD, each of the radio frame structures being associated with a different CIF value from each other.

25. The apparatus of claim 18, wherein the radio frame structure of the first uplink and downlink configuration comprises DSUDDDDDDD and the radio frame structure of the second uplink and downlink configuration comprises DSUFDDDDDD or DSUFFDDDDD, each of the radio frame structures being associated with a different CIF value from each other.

* * * * *

UNITED STATES PATENT AND TRADEMARK OFFICE
CERTIFICATE OF CORRECTION

PATENT NO. : 9,544,823 B2
APPLICATION NO. : 13/608369
DATED : January 10, 2017
INVENTOR(S) : He et al.

It is certified that error appears in the above-identified patent and that said Letters Patent is hereby corrected as shown below:

On the Title Page

In item (57), in "Abstract", in Column 2, Line 7, delete "sub frame" and insert --subframe--, therefor In the Claims In Column 15, Line 15, in Claim 1, delete "LIE" and insert --UE--, therefor In Column 16, Line 27, in Claim 11, delete "(LTE)" and insert --UE--, therefor In Column 16, Line 32, in Claim 11, delete "information" and insert --Information--, therefor In Column 16, Line 45, in Claim 11, delete "S1131" and insert --SIB1--, therefor Signed and Sealed this
Twenty-first Day of April, 2020

Andrei Iancu
*Director of the United States Patent and Trademark Office*